United States Patent [19]

Freeman et al.

[11] Patent Number: 5,658,166

[45] Date of Patent: Aug. 19, 1997

[54] MODULAR COUPLER ARRANGEMENT FOR USE IN A BUILDING WIRING DISTRIBUTION SYSTEM

[75] Inventors: Mike Freeman, Reading, England; Stuart Keith Morgan, Westford; Mike Romm, Brighton, both of Mass.

[73] Assignee: Digital Equipment Corporation, Maynard, Mass.

[21] Appl. No.: 447,358

[22] Filed: May 23, 1995

Related U.S. Application Data

[60] Continuation of Ser. No. 145,001, Oct. 29, 1993, abandoned, which is a division of Ser. No. 7,805, Jan. 22, 1993, abandoned, which is a continuation of Ser. No. 759,931, Sep. 16, 1991, abandoned, which is a continuation of Ser. No. 544,754, Jun. 27, 1990, abandoned.

[51] Int. Cl.$^6$ ............................................. H01R 13/518
[52] U.S. Cl. .................................... 439/540.1; 439/49
[58] Field of Search .............................. 439/540.1, 49, 439/332, 397, 442, 443, 43, 44, 47, 48, 50, 52-54, 535, 557, 544, 676, 752

[56] References Cited

U.S. PATENT DOCUMENTS

| | | | |
|---|---|---|---|
| 2,783,443 | 2/1957 | Jencks | 439/362 |
| 3,790,923 | 2/1974 | Mathe | 439/557 |
| 4,117,585 | 10/1978 | Smith | 29/566.3 |
| 4,126,935 | 11/1978 | Rhines et al. | 29/857 |
| 4,210,999 | 7/1980 | Smith | 29/857 |
| 4,295,702 | 10/1981 | Snyder | 439/352 |
| 4,428,636 | 1/1984 | Kam et al. | 439/676 |
| 4,862,580 | 9/1989 | Wang et al. | 29/566.4 |
| 4,875,880 | 10/1989 | Welch et al. | 439/536 |
| 4,904,209 | 2/1990 | Nelson | 439/676 |
| 4,909,757 | 3/1990 | Reed | 439/532 |
| 5,057,035 | 10/1991 | Drewnicki | 439/425 |
| 5,087,210 | 2/1992 | Myers et al. | 439/425 |
| 5,109,591 | 5/1992 | Hung | 29/566.4 |

FOREIGN PATENT DOCUMENTS

| | | |
|---|---|---|
| 0 027 044 | 3/1980 | European Pat. Off. . |
| 0 114 464 | 11/1983 | European Pat. Off. . |
| 0 319 138 | 10/1988 | European Pat. Off. . |
| 2 227 656 | 3/1974 | France . |
| 835 919 | 10/1952 | Germany . |
| 764 355 | 11/1952 | Germany . |
| 1804 846 B2 | 10/1968 | Germany . |
| 3114223 A1 | 4/1982 | Germany . |
| 3717 691 A1 | 5/1987 | Germany . |
| 3836 360 A1 | 10/1988 | Germany . |
| 59-165382 | 9/1984 | Japan . |
| 53-59190 | 5/1987 | Japan . |
| 62-99185 | 6/1987 | Japan . |
| 1-126078 | 8/1989 | Japan . |
| 1 349 607 | 1/1972 | United Kingdom . |
| 8 802 2190 | 3/1988 | WIPO . |

OTHER PUBLICATIONS

Lapp Kabel, *Kabel und Leitungen*, Mai 1986.
Lapp Kabel, *Katalog N 90*, Marz 1990.
*Technisch–Physikalische Sammlung*, Prof. Dr. Rudolf Sewig, Dr. Dieter Ross, Frankfurt AM Main 1974.
*Kabel und Leitungen*, Katalog K 31, Mai 1986.

*Primary Examiner*—Gary F. Paumen
*Attorney, Agent, or Firm*—Arnold, White & Durke

[57] ABSTRACT

A wiring distribution system including connectors, tools, and methods is provided for building wiring. The mechanical and electrical interconnection is performed to the individual connector components in a crimping operation to the individual wires after removal of the outer covering. Using panels with apertures for accepting interchangeable connectors reduces the layers of connecting panels used between a wallplate and a computer.

4 Claims, 5 Drawing Sheets

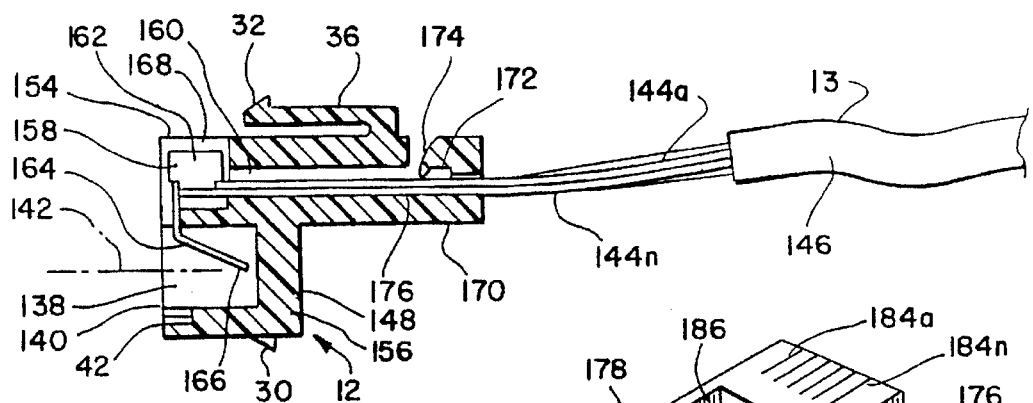
FIG. 6
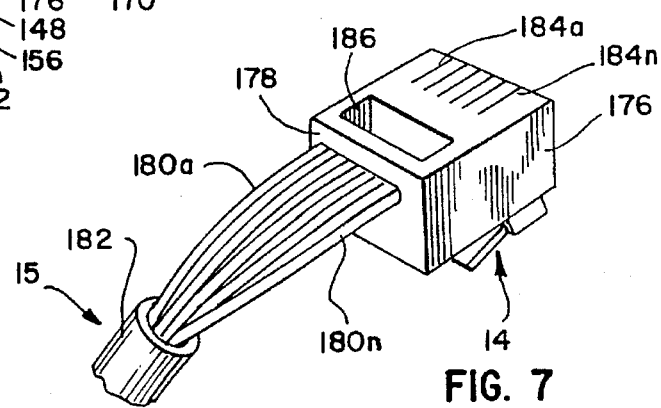
FIG. 7
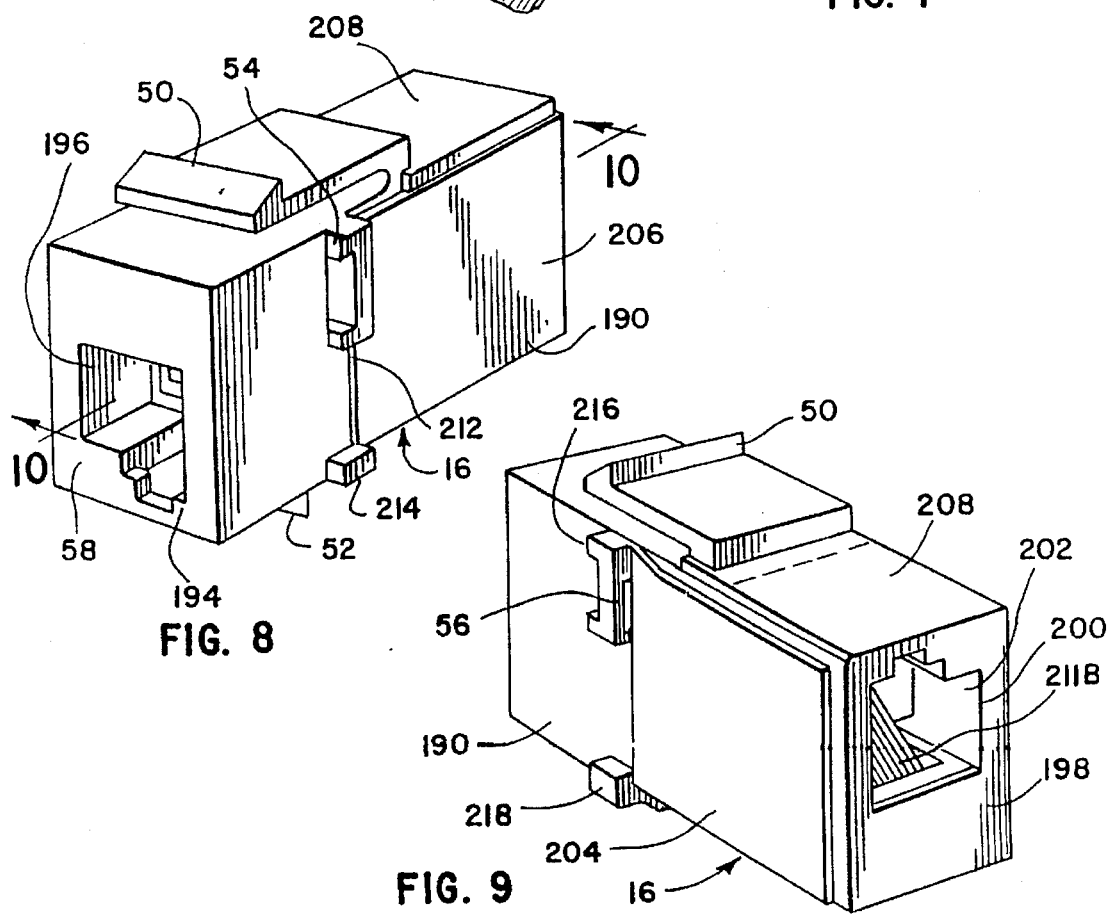
FIG. 8
FIG. 9

MODULAR COUPLER ARRANGEMENT FOR USE IN A BUILDING WIRING DISTRIBUTION SYSTEM

This application is a continuation of application Ser. No. 08/145,001, filed Oct. 29, 1993, now abandoned, which application is a divisional of application Ser. No. 08/007,805, filed Jan. 22, 1993, now abandoned, which application is a continuation of application Ser. No. 07/759,931, filed Sep. 16, 1991, now abandoned, which application is a continuation of application Ser. No. 07/544,754, filed Jun. 27, 1990, now abandoned.

FIELD OF THE INVENTION

The invention relates to a wiring distribution system using connectors, tools and methods for providing the mechanical and electrical interconnection between twisted-pair wiring. More particularly, the invention relates to a modular building wiring system including connectors and tools that provide simplified and efficient terminations for twisted-pair wiring and the methods for forming such interconnections.

BACKGROUND OF THE INVENTION

Twisted-pair cable particularly in building wiring systems provides a transmission medium for communication of data or other signals at high speeds, with great reliability and for relatively low cost. It will be understood by those skilled in the art to which this invention pertains that the term "twisted-pair" cable refers to a plurality of electrically conducting wires housed within an insulative outer covering with each pair of wires carrying differential signals and twisted together to diminish extraneous noise or crosstalk which otherwise reduces the integrity of the signal. In addition, the term "building wire" refers to any twisted-pair conductors that have a sufficiently long length that would preclude other wiring types such as flat conductors due to the deterioration of signal integrity over such length. Building wiring typically connects a central computer to a plurality of remotely located user terminals and is routed between the central computer and the various user terminals by placing it in locations such as in the walls or ceiling of a building.

In general, all of the twisted-pair wires used in building wiring are bundled together and surrounded by a cover thereby forming a substantially round cable. Since all of the twisted-pairs of wires are arbitrarily collected or bundled together, each of the individual wires achieves a random orientation between the point of origin and the point of termination. When the distal end of the cable is terminated, the individual wire conductors are disoriented with respect to their position at the point of origin and accordingly must be manipulated into an ordered sequence as prescribed by the terminating connector used. In addition, the individual wires comprising the twisted-pair cable are typically solid for improved transmission of information over long distances. The flexibility found in stranded wire is unnecessary since building wire is not exposed to as much strain or stress.

In contrast, when a cable is used in an external office space and the length of the transmission line is relatively short, the wire conductors comprising the transmission cable are placed in flat wire. In this arrangement, the individual wire conductors remain ordered within the flat housing at any point along the length of the cable between the point of origin and the point of termination. In addition, the wire conductors used in flat cable for connecting data equipment are typically stranded to reduce fatigue from constant movement.

Known building wiring distribution systems have concentrated bundles of twisted-pair wires to carry signals from a central computer through the walls or ceiling of a building to a wall faceplate. For example, twenty-five pairs of wires are frequently bundled together and surrounded by a protective covering or sheath to form a single trunk cable of building wiring. The signals transmitted over building wiring can originate from virtually any source for example, computer mainframes, minicomputers, data storage systems or other data units. Typically, this active equipment is located a substantial distance from the point of termination such as across a large room or on a different floor of a building. The point of termination is usually a wall panel or faceplate which receives the building wiring and permits connection of external data equipment such as individual user terminals to the building wiring. Flat cable typically links such external data equipment to the point of termination at the wall panel.

In actual practice, a specified wallplate is not directly connected by building wire to a central or mainframe computer but rather the building wire is terminated and reconnected at various intermediate patch panels or punch blocks. Each one of these intermediate points at which the building wire is terminated and reconnected is referred to as a layer of connection. The patch panel is connected to the mainframe computer by building wiring and provides a point of distribution for signals carried by the building wiring from the mainframe computer. Punch blocks consolidate wires from individual wallplates so that these individual wires can be connected to the patch panel by a trunk cable.

Patch panels have connection points comprising fixed numbers of certain types of hardwired connectors which are not easily changed. These connectors are dedicated to a specific type of mating connector or wiring configuration. The type of mating connector suitable for these connectors is predetermined according to the construction of the patch panel. Accordingly, if all the connectors are being used or if a different type of connector is required, an entirely new prewired patch panel must be installed to provide appropriate connectors or alternatively extensive rewiring of the patch panel is required.

The front side of the patch panel has connectors for accessing building wiring carrying information from the mainframe computer. Other connectors access building wiring carrying information ultimately to wallplates. Patch cords are used to connect between these individual connectors to make a final connection between the computer and the wallplates.

The back of the patch panel is configured to accept connectors which terminate a plurality of twisted pair wires of building wiring. Some of these connectors terminate building wiring which is carrying information from a mainframe computer to the patch panel. Other connectors terminate building wiring which is carrying information from the patch panel to punch blocks and ultimately to wallplates.

Building wiring used for sending information to user terminals from the back of a patch panel typically terminates at a punch block. The punch block concentrates all the terminated wires into a single connector which usually contains thirty-six pins for terminating thirty-six wires or fifty pins for terminating fifty wires. These individual wires are punched to the punch block, which makes rewiring difficult. Individual wallplates are connected to this punch block with cables containing a smaller number of wires.

A typical sequence of cables and connections from a mainframe computer to a user terminal begins at the computer. A first building wire trunk cable having a thirty-six pin or fifty pin connector on both ends of the trunk cable connects the computer to the back of a patch panel. Patch cords used on the front of the patch panel appropriately connect building wires of the first trunk cable to a second trunk cable. The second building wire trunk cable connects the back of the patch panel to a punch block. At the punch block, individual connections are made from one end of the second trunk cable to individual wallplates thereby linking a selected output of the computer to a selected wall plate.

Whenever existing building wiring distribution systems are reconfigured, specified individual wires are separated from the other wires of the trunk cable and are grouped together. An additional connector is used to terminate and reroute this group of wires. Because the additional connector creates a new point of connection, an additional punch block or an additional printed circuit (PC) board with an appropriate mating connector is necessary to interconnect the rerouted group of wires with other points of connection further downstream within the wiring distribution system. In some cases, the original punch block contains unused connection points so that the punch block can be stripped down, and the group of wires can be reinstalled at increased time, cost and complication.

Other types of building wiring systems use multiple layers of connection panels with hardwired modular components. In known jack panel mounting systems, a modular plug snaps into a board-mounted modular jack held in place at a point of termination at a wall panel. This forms a first layer of connection. The board typically has 16 board-mounted modular jacks, with eight of the modular jacks hardwired to a first thirty-six pin connector on the back of the board.

The first thirty-six pin connector connects a thirty-six wire building cable to a second thirty-six pin connector which is attached to a second set of eight board mounted modular jacks held by a second jack panel. A third jack panel holds another eight board mounted modular jacks having a thirty-six pin connector at the back. This thirty-six pin connector is connected to the computer by another thirty-six wire cable. Patch cable connected between selected modular jacks of the second jack panel and selected modular jacks of the third patch panel connects the central computer outputs to specified termination points. This arrangement requires at least three layers of jack panels or intermediate points of inter-connection.

In known modular wiring distribution systems, modular jack connectors typically terminate twisted-pair building cable at a point of termination such as a wall plate to permit connection to external data devices. Each modular jack includes a portion defining a complementary cavity formed within a side wall of the modular jack. A modular plug terminating the flat cable fits within the complementary cavity to form the electrical interconnection. In this way, data communication is provided to and between different data units.

Although widely used as a data carrying media, the installation and maintenance requirements of known modular building wiring systems have posed practical difficulties. Principal among these difficulties is the interconnection between two twisted-pair cables. Such difficulties also arise in a twisted-pair cable to flat cable interconnection. In general, office spaces which have changing equipment configurations frequently encounter these problems.

Known twisted-pair modular connectors couple the conducting wire ends of the twisted pair cable to the connector. Methods for terminating twisted-pair cable within jack assemblies utilize an insulation displacement contact termination. The individual wires comprising the cable are sequentially placed on respective fork or barrel terminals of the jack assembly and thereafter punched or pressed into the jack assembly, one at a time, using a specialized tool. The conducting portions of the individual wires are brought into actual contact with complementary contacting portions within the connector. With this mode of connection, it is necessary to manipulate and capture the individual wire conductors at a closely controlled location, because positioning of the conductor has a critical impact on the desired efficiency of the electrical interconnection. Accordingly, such connectors tend to require an inordinate time to align and thereafter insert individual wires of the cable with respective receiving portions of the connector. Further, such connectors tend to misalign upon the application of rotational, longitudinal, or lateral forces.

Known methods for terminating twisted-pair cable with modular plug assemblies are quite similar or the same as methods for terminating flat cable. Such methods employ a crimping technique wherein a relatively small portion of the outer covering layer is removed from the distal end of the cable. Thereafter, the wires are ordered and placed within the plug assembly by hand. The covering layer is likewise placed within the plug connector assembly and is grasped therein when the crimp operation is completed to provide strain relief for the cable. Such methods are suitable for flat cable, where the individual exposed wires remain ordered after removal of a small portion of the covering layer. However, building wiring poses the additional practical problem of manipulating and ordering the individual wires with only small portions of the wire exposed.

Still further problems in known building wire systems frequently arise when the system is reconfigured or equipment upgraded or changed. For example, when interconnections are changed at a terminal location such as a wallplate, the existing jack assembly terminating the twisted-pair cable is routinely replaced with a new modular jack assembly. However, the twisted-pair cable must again be terminated with the new modular jack assembly. Moreover, any system reconfiguration using this method of termination requires a significant amount of installation time.

Twisted-pair modular connectors in general are susceptible to longitudinal forces on the conducting portions of the twisted-pair cable. Retention of the individual wire conductors forming the interconnection is therefore another frequent problem. Each wire conductor must be secured to prevent relative movement of the wire and mating connector since virtually any movement adversely effects the quality of the interconnection. The physical attachment of the cable, however, must avoid the application of undue stress on the cable or the individual wire conductors which causes eventual breakage of the wire conductors due to stress fatigue.

Accordingly, known types of building wiring systems and connectors, while performing satisfactorily under certain circumstances, are overly complex and difficult to install, maintain and modify. The assembly and maintenance of multiple layers having complex mechanical parts associated with such systems involve considerable wasted effort owing to installation of intermediate layers of interconnection. The connectors used require alignment of the individual wire conductors within the connector and completing the mechanical termination of the cable. Moreover, known methods and devices for termination are quite time consuming and labor intensive because each wire is handled and terminated individually. In addition, a relatively high level of training is required to determine appropriate routing of the building cable and field termination of the distribution components.

SUMMARY OF THE INVENTION

The present invention is a wiring distribution system for building wiring and the connectors, tools and methods for providing the electrical and mechanical connection of building wiring in the system. The wiring distribution system uses modular termination components for patching or direct connection, and an n-position panel which is configured to receive and accommodate the modular components. The modular components are interchangeable to provide wiring distribution modification without the need for replacing and reterminating individual hardwired connectors. None of the n-position panels are dedicated to a specific number of connectors of a specific type.

In the preferred embodiment, an n-position panel contains eight receiving apertures. Standard modular connectors are modified to engage the receiving apertures of the n-position panel so that any type of wiring can be installed in the n-position panel including twisted-pair, thin wire, video, telephone cable, and fiber optic cable.

Building wiring is terminated and interconnected with modular components. For example, building cable may be terminated with a modular plug which is snapped into and held by a modular coupler. The modular coupler snap-fits into the n-position panel and provides a point of connection for other modular plugs. Building wiring is also terminated with a crimp modular jack that snap-fits into the n-position panel to provide a point of connection for a modular plug, thereby providing access to information carried over the building wiring. In this way, system components are linked through a series of prefabricated cables and connectors thereby eliminating hardwiring or punching of discrete wires to terminals permanently attached to patch panels, punch blocks, or wallplates.

The present invention reduces at least one layer of connection panels. Inasmuch as building wiring terminations at the patch panel are made with modular plugs interconnected with a modular coupler, exiting building cable may be led directly from the back of the patch panel to the point of termination without consolidation of the building wiring into trunk cable. Alternatively, exiting building cable may be terminated at the patch panel with a modular jack and thereafter led directly to the point of termination as discrete building wiring. Due to its modular size, the wiring system according to the invention also reduces the amount of floor space necessary to contain the jack panels. Because active electronic components are being reduced in size, the amount of floor space necessary to support all of the equipment is reduced by 80 or 90%.

Each position of an n-position panel according to the invention accommodates any modular coupler, any crimp modular jack or other standard connectors modified to snap-fit in the n-position panel, to provide a simplified and flexible building wiring distribution. The n-position panel is used at a variety of locations within the building wiring system such as at wallplate locations, at an equipment rack, or a part of a furniture system bracket. Standard sized wallplates with receiving apertures also provide termination points at the wall. Accordingly, when user requirements change, changing or moving equipment on the user side does not necessitate rewiring connections or installing additional panels inside the walls.

For instance, modular couplers can be configured to accommodate a six conductor or an eight conductor cable. Should the user desire to change from an eight wire system to a six wire system, the modular coupler can be changed at the n-position panel or faceplate to accept the new modular plugs which are installed on either end of the cables. The system does not require any changes to hardwire connections since none were used in the first instance.

The wiring distribution system comprises three modular components for termination and interconnection of building cable: a crimp-type modular jack; a crimp-type modular plug; and a modular coupler. In one preferred embodiment, a crimp-type modular jack connector provides one-half of a solderless electrical connection by securing a twisted-pair cable at its individual wires and without gripping its surrounding covering layer. The modular jack includes a head section having longitudinal slots and electrical contact elements spaced relative to the longitudinal slots. To effect a termination, at least a portion of the covering layer is removed from the cable to expose the individual wires. The wires are then ordered in an appropriate sequence for placement within the connector. The covering layer is sufficiently removed for the efficient manipulation of the individual wires. Thereafter the individual wires are simultaneously inserted into the longitudinal mating slots in the connector. The head section is thereafter crimped by an appropriate tool so that the contact elements are compressed transversely inward and engage the conductive portions of the individual wires.

The modular crimp jack connector includes a tail section having an inelastically deformable portion. During the crimp operation, the deformable portion is compressed to grip and secure the individual wires. In addition, the head portion of the connector includes a face portion having an aperture therein defining a receiving cavity dimensioned to receive a mating plug connector. The electrical contact elements include portions extending into the receiving cavity. In this way, a mating plug may fit within the connector to provide an electrical interconnection.

In another embodiment, a plug connector for terminating twisted-pair cable particularly in building wiring is provided using the crimping method of the invention. As with the crimp jack connector, a portion of the covering layer is removed from the individual wires comprising the cable. The individual wires are thereafter readily ordered and crimped in the same manner as the crimp jack connector.

In another embodiment, a modular coupler is provided for electrically interconnecting two modular plug assemblies. The modular coupler comprises an insulative housing having longitudinal faces that include mating apertures which define receiving cavities for access of the plug assemblies. The modular coupler also houses a plurality of conducting members that electrically connect the contact elements of the respective plug assemblies to form an electrical interconnection. The modular coupler interconnects twisted-pair cable with flat cable as well as twisted-pair cable with twisted-pair cable.

The invention also provides a die insert and anvil section for use in a crimp tool of the type known to those skilled in the art. The die insert defines a receiving cavity of a size and dimension to receive the crimp modular jack of the present invention. The die insert is spaced relative to an anvil section which includes an element for driving the housing deformable portion as well as an element for driving the contact elements of the modular jack during a crimping operation. The die insert and anvil sections are easily interchangeable with complementary inserts for effecting a crimp to a modular plug. In this way, the crimp tool may be used for securing a modular plug or a modular jack.

BRIEF DESCRIPTION OF THE DRAWINGS

For a more complete understanding of this invention, reference should now be made to the embodiments illustrated in greater detail in the accompanying drawings, and described below by way of examples of the invention.

In the drawings:

FIG. 6 is a section view of the modular jack assembly of FIG. 5 taken along the lines 6—6.

FIG. 7 is a perspective view of a modular plug for terminating wiring using the crimping method according to the present invention.

FIG. 8 is a perspective view of a coupler assembly for interconnecting a pair of modular plugs showing one mating end.

FIG. 9 is a perspective view of the coupler assembly shown in FIG. 8 showing a complementary mating end.

It should be understood that the drawings are not necessarily to scale and, in certain instances, details may have been omitted which are not necessary for an understanding of the present invention.

DETAILED DESCRIPTION OF THE PREFERRED EMBODIMENTS

The present invention relates to a building wiring distribution system having a plurality of twisted-pair wires. In accordance with the invention, modular termination devices and discrete cables provide a complete building wiring system that is easily maintained and easily altered. The present invention reduces not only maintenance costs but also reduces by at least one the number of layers of connecting panels used in prior art systems. The invention has particular application in data communication networks wherein electrical connection is made between and to data units. Bundled twisted-pair wiring is used in such arrangements since signal integrity must be maintained over large distances to provide communication between units.

The present invention also relates to termination devices and methods for terminating twisted-pair cable used in the wiring distribution system. In accordance with the invention, a crimping method is provided for terminating modular jack connectors as well as modular plug connectors within the building wiring scheme. The invention provides a solderless connection by securing and crimping the individual wires of building cable without its surrounding covering layer. In this way, a durable and efficient mechanical and electrical interconnection is made to the individual wires. Further, a modular coupler assembly is provided for interconnecting a modular plug terminating a first twisted-pair cable with a complementary modular plug terminating a second twisted-pair cable or even flat cable.

The term "modular jack" is used herein in its generic sense to denote, for example, a modular jack ("modular jack") known to those skilled in the art as having a key slot centrally located within the plug receiving aperture. The term "modular jack" also denotes a modified modular jack ("MMJ") having an eccentrically located keyed slot within the plug-receiving aperture, and customarily used in conjunction with Decnet® arrangements. However, the term "MMJ" will denote any modified modular jack. Similarly, the term "modular jack" will denote a modular jack of the specific keyed type of jack connector described above.

Likewise, the term "modular plug" is used in its generic sense to denote in one instance a modular plug ("MP") having a keyed portion centrally located for reception within a modular jack. The term "modular plug" also denotes a modified modular plug ("MMP") having an eccentrically located keyed portion for reception within an MMJ. However, the terms MP and MMP will denote modular plugs of the specific types described above.

Figure 1:
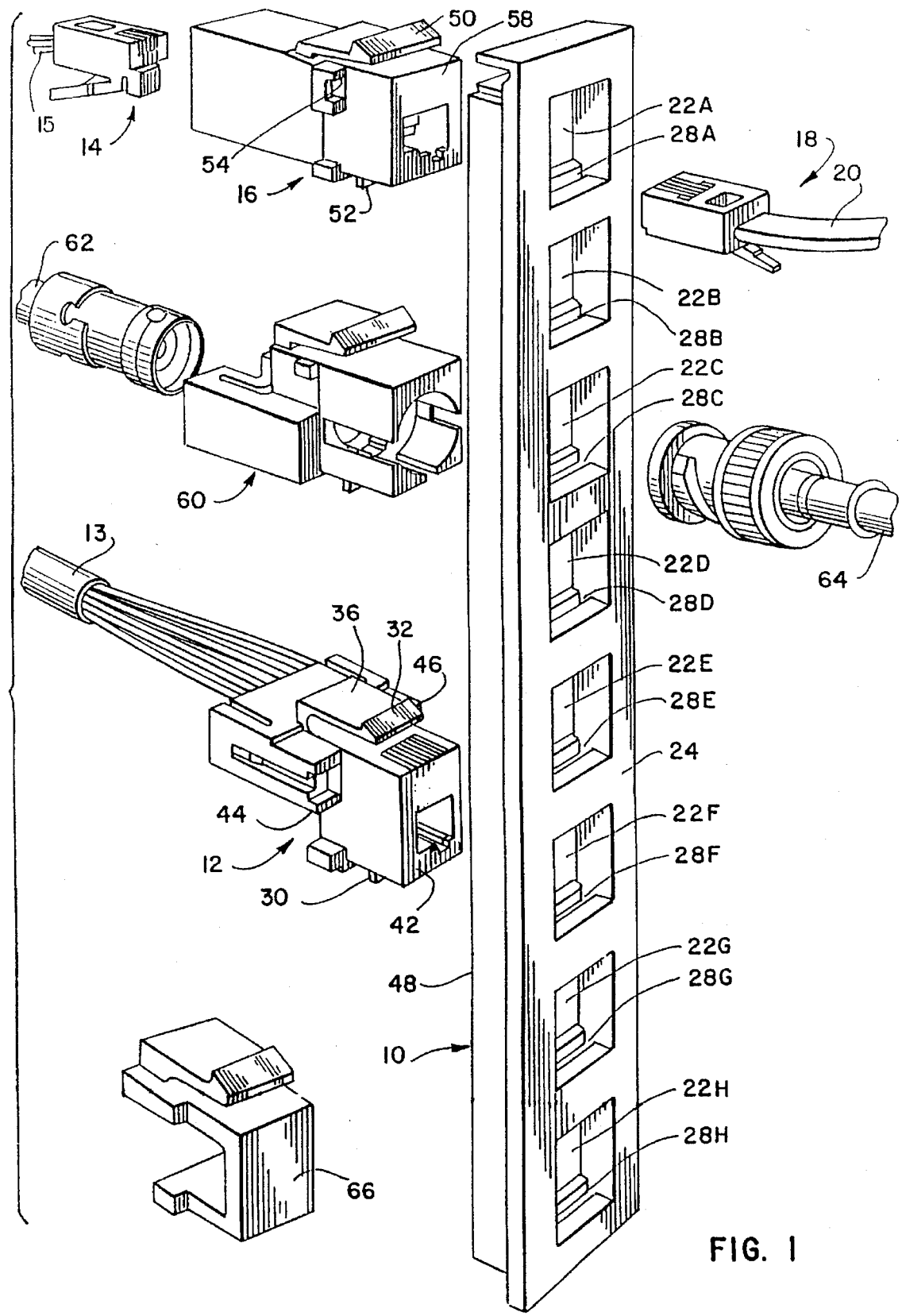
FIG. 1 is an exploded perspective view of the devices of the present invention shown relative to an n-position panel.

FIG. 1 shows modular termination components according to the present invention spaced relative to an external n-position wall panel 10 (n indicates the number of receiving apertures). The modular components include a crimp modular jack 12 for terminating building wiring 13, a crimp modular plug 14 for terminating building wiring 15, a modular coupler 16, and a modular plug 18 of the type known in the art for terminating a flat cable 20. It will be appreciated that the orientation of the components shown in FIG. 1 is just an example of many combinations which may be used in accordance the invention.

The wall panel 10 in one embodiment has eight receiving apertures 22A–H and a front panel 24. Each receiving aperture 22A–H contains upper engagement tracks 26A–H (not shown) and lower engagement tracks 28A–H. The upper and lower engagement tracks 26A–H and 28A–H are used to engage the locking tabs and seating tabs, respectively, of a variety of components including the crimp modular jack 12 and the modular coupler 16, the details and structure of which are described in greater detail herein. When the crimp modular jack 12 is inserted within the receiving aperture 22F, a seating tab 30 engages the lower engagement track 28F and an interlocking tab 32 engages the upper engagement track 26F (not shown). The interlocking tab 32 includes a flexible blade 36 which permits the interlocking tab 32 to be forced downward during engagement with the upper engagement track 26F, thereby providing a secure yet easily changed mounting system for the n-position panel 10. When the modular jack 12 is secured within the receiving aperture 22F, a face surface 42 of the modular jack 12 is flush with the front panel surface 24. As the crimp modular jack 12 is inserted into the receiving aperture 22F, stop surfaces 44 and 46 of the modular jack 12 abut a back wall 48 of the wall panel 10 to securely fit the modular jack 12 within the wall panel aperture 22F.

The modular coupler 16 is similarly inserted into a receiving aperture 22A. A locking tab 50 and seating tab 52 of the modular coupler 16 engage the upper engagement track 26A (not shown) and the lower engagement track 28A of the aperture 22. As with the modular jack 12, stop surfaces 54 and 56 of the modular coupler 16 (shown in FIGS. 8–10) abut the back wall 48 of the wall panel 10 to securely mate the modular coupler 16 within the wall aperture 22A. When inserted, the face 58 of the coupler 16 is flush with the front panel surface 24. The modular coupler 16 could just as easily be interchanged with the location of modular jack 12 within the receiving aperture 22F.

Twisted-pair cable may be terminated, for example at an exterior wall, with either the crimp modular jack 12 or a modular plug 14. This feature provides greater flexibility than known modular wiring systems which typically terminate twisted-pair cable using only modular jacks. The use of the modular coupler 16 provides an advantage for many wiring interconnections since modular plugs such as plug 14 may easily be inserted and removed therefrom. The modular coupler 16 is particularly well suited in wiring arrangements which accommodate frequent changing equipment configurations. However, these arrangements have a concomitant higher cost of installation since more components are used than in terminations of building wire using a modular jack 12. Accordingly, the devices described herein may be utilized in many combinations depending on the particular application.

As seen in FIG. 1, a number of other connectors are frequently mounted in the n-position panel 10. A video connector 60 permits video signals carried via cables 62 and 64 to be easily accessed through mounting as will be known to those skilled in the art. Also, should any receiving apertures 22A-H be unoccupied by connectors, a blank insert 66 can be received by the n-position panel 10. The blank insert 66 not only closes off the receiving aperture 22H for a safety precaution but provides aesthetic features as well.

Figure 2:
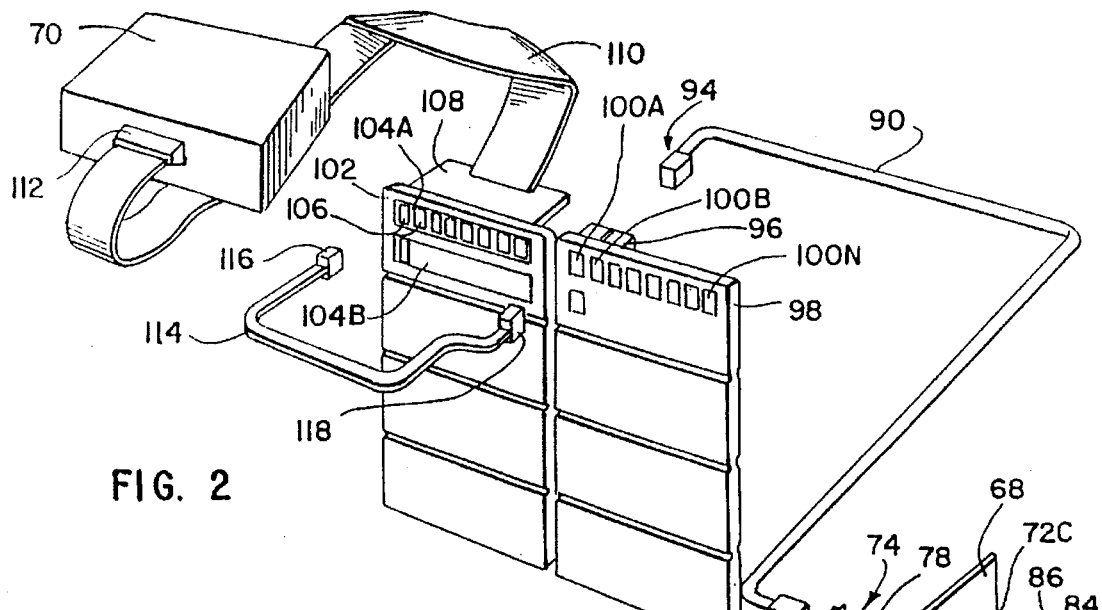
FIG. 2 shows one embodiment of the present invention which includes a plurality of couplers and cables terminated with crimp modular plugs.

FIG. 2 illustrates one embodiment of the wiring distribution system for building wiring of the present invention. A faceplate 68 is permanently fixed to a wall and provides the point of termination at which information is obtained such as from a mainframe computer 70. The faceplate 68 contains a plurality of receiving apertures 72A-C whose size and dimension is determined by the dimension of a particular type of jack or coupler. Each of the receiving apertures 72A-C contains an upper engagement track and a lower engagement track (not shown) of the type previously shown in FIG. 1 and whose function has been previously described herein. For instance, the receiving aperture 72A contains an upper and lower engagement track for receiving a first modular coupler 74. The first modular coupler 74 has a front surface 76, a locking tab 78 and a seating tab 80. When seated, the front surface 76 is flush with the front surface of faceplate 68. The locking tab 78 and seating tab 80 engage the upper and lower engagement tracks as previously described. A first aperture 82 provides the point of termination for external access by the user. In this instance the user accesses the computer with a cable 84 terminated with a modular plug 86.

Because the first modular coupler 74 has a locking tab 78 and a seating tab 80, the type of aperture 82 provided to the user can be easily changed by replacing the first modular coupler 74 with another modular coupler or modular jack connector. For instance, should the user require new equipment using a different type of plug, the change is easily made without modification to or without any rewiring of the building wiring. Once the user has determined the appropriate type of modular coupler, the remaining connections to the computer 70 can be made.

A second aperture 88 in the first modular coupler 74 provides access for a modular plug. In this case a cable 90 has ends terminated in a first modular plug 92 and a second modular plug 94. The first modular plug 92 engages the second aperture 88 to provide a point of connection for the building wiring. The second modular plug 94 engages a second modular coupler 96, identical in construction to the first modular coupler 74. The second modular coupler 96 is held by a first n-position panel 98 having a plurality of receiving apertures 100A-N with upper and lower engagement slots as previously described. The receiving apertures 100A-N provide points at which signals generated by the computer are be forwarded to selected faceplates.

A second n-position panel 102 contains long rectangular openings 104A-B for receiving a plurality of modular couplers 106 attached to a PC board 108. The PC board 108 includes means for mounting the PC board 108 to the n-position panel. A ribbon cable 110 extends from the PC board 108 and electrically connects the plurality of modular couplers 106. The ribbon cable 110 terminates in a thirty-six pin connector 112 which connects to the computer 70.

To make a connection from the computer 70 to a selected faceplate, in this case the faceplate 68, a patch cable 114 is used. The patch cable 114 is terminated with a first modular plug 116 and a second modular plug 118. By inserting the first modular plug 116 into a selected modular jack 106 and inserting the second modular plug 118 into a selected modular coupler 96, a final connection is made between the computer 70 and the faceplate 68.

Figure 3:
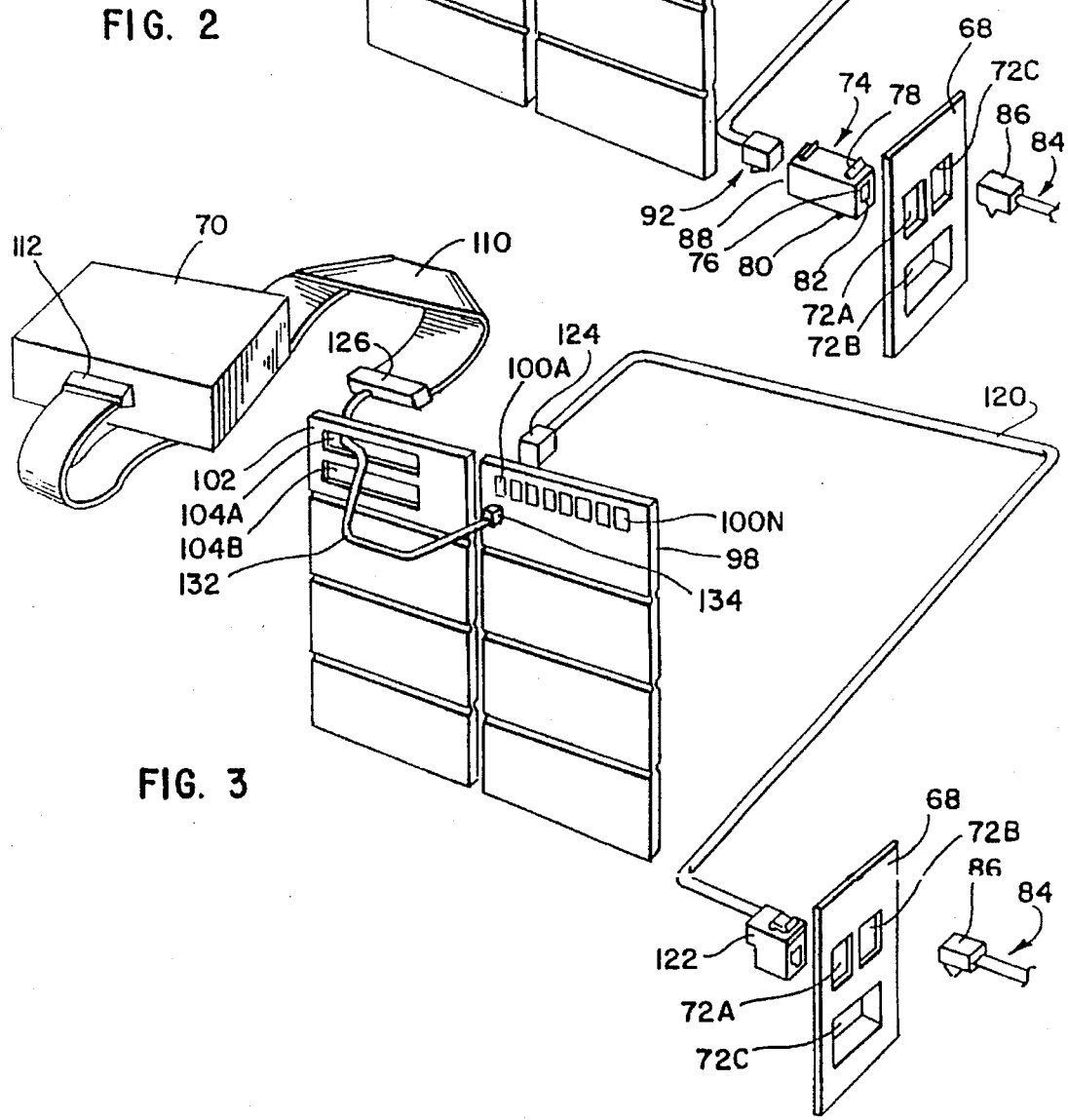
FIG. 3 illustrates another embodiment of the present invention which includes a cable terminated with crimp modular jacks.

FIG. 3 illustrates another embodiment of the present invention. FIG. 3 contains a number of elements common to both FIG. 2 and FIG. 3. They are the faceplate 68, the computer 70, the cable 84, the first n-position panel 98, the second n-position panel 102, and the ribbon cable 110 terminating in the thirty-six pin connector 112.

In this embodiment, the first modular coupler 74, the second modular coupler 96 and the cable 90 having ends terminated in the first modular plug 92 and the second modular plug 94, as seen in FIG. 2, are eliminated. A cable 120 having a first crimp modular jack 122 and a second crimp modular jack 124 at either end provides an alternative mode of distribution. The crimp modular jack 122 snaps into the faceplate 68 and the receiving aperture 72A as previously described. The crimp modular jack 124 fits within the receiving aperture 100.

Figure 4:
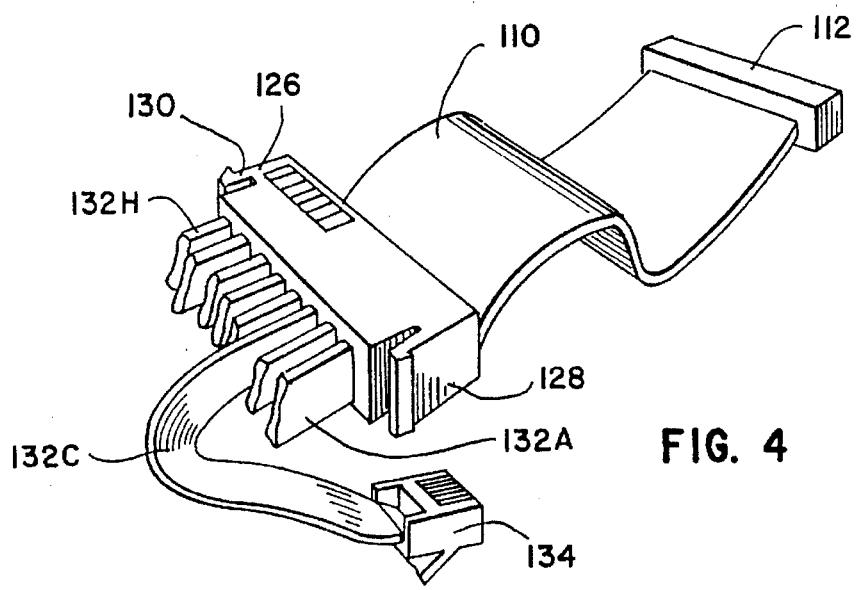
FIG. 4 illustrates a ribbon cable terminated at one end in a junction box having a plurality of cables terminated with crimp modular jacks.

The ribbon cable 110 is terminated with a junction box 126 which has locking tab means on either side to engage the long rectangular opening 104A. FIG. 4 illustrates in greater specificity the ribbon cable 110 terminating in the junction box 126. As seen, the junction box 126 has a first side locking tab 128 and a second side locking tab 130 which is seated within the rectangular opening 104B to hold the junction box 126 as would be understood by one skilled in the art. In this embodiment, the junction box 126 includes eight flat cables 132A-H with flat cable 132C illustratively terminated in a modified modular plug 134.

To make the final connection between the crimp modular jack 122 at the wallplate 68 and the computer 70, the modular plug 134 is seated in the crimp modular jack 124. Of course, modification to the wiring distribution systems disclosed in the aforedescribed examples will occur to those skilled in the art.

Figure 5:
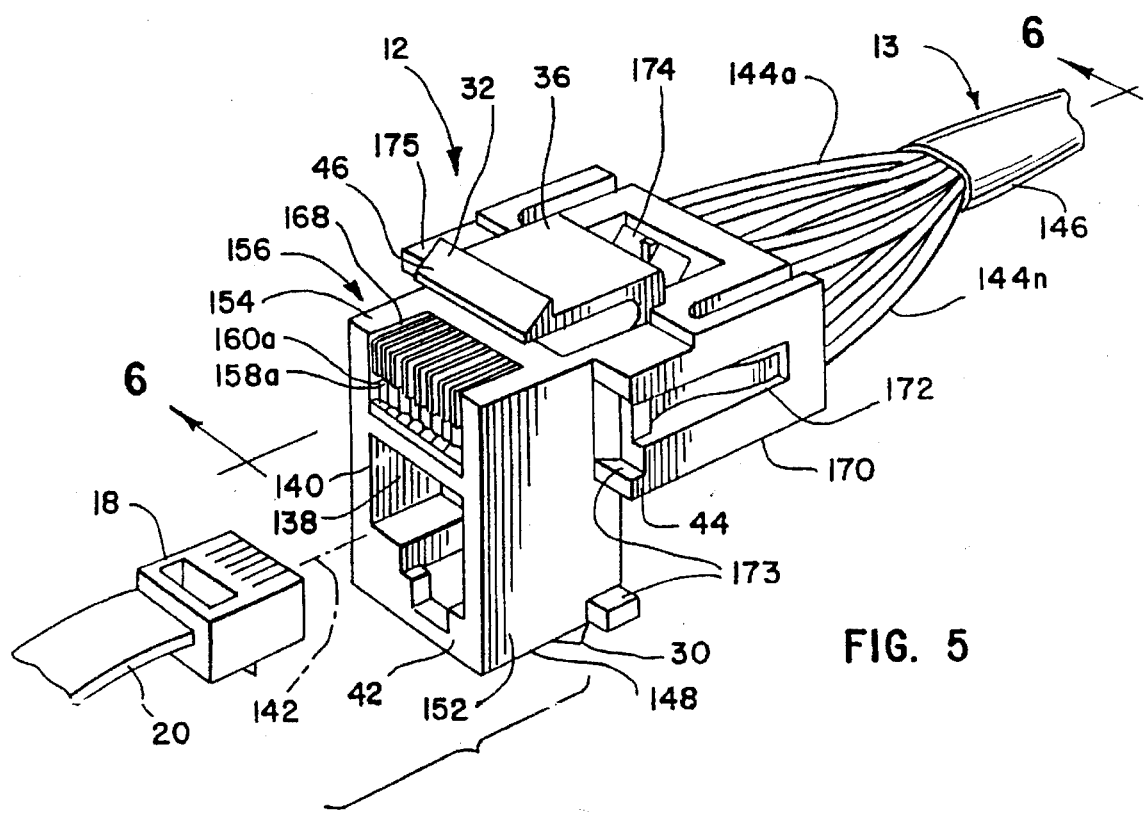
FIG. 5 is a perspective view of a modular jack assembly forming one half of an electrical connection as well as a complementary mating modular plug assembly which forms the electrical connection.

FIGS. 5 and 6 show the assembled components of the crimp-type modular jack connector 12 also shown in FIG. 1 for forming one half of an electrical connection and terminating a multi-conductor building cable 13 according to the present invention. The crimp-type modular jack 12 includes an interior cavity 138 accessible through a central aperture 140 which is sized and shaped to receive and mate with a modular plug 18. The modular plug 18 mates along a central axis 142 which is normal to the central aperture 140. In one application, the modular plug 18 terminates flat cable 20 for providing communication to data units (not shown) in an exterior space as is known to those skilled in the art.

In a typical wiring distribution system, the twisted-pair cable comprises a bundle of wire conductors, shown as conductors 144a through 144n housed in a substantially round outer covering 146. Such cable has a particular application where data is transmitted over relatively long distances or where signal integrity must be maintained regardless of distance. In many applications, the wire conductors 144 comprise three, four, or more twisted-pairs. It should be further understood that each of the wire conductors 144a through 144n is typically fabricated of solid conducting wire enclosed in an insulative covering. While such wire is unable to withstand the stress and fatigue of stranded wire, it is suitable for use in selected wire applications where the wire is essentially immobile, for example, in building wiring.

Inasmuch as the cable covering 146 is typically substantially round, the individual wire conductors lose orientation between the point of origin and the point of termination of the cable 13. Accordingly, skilled personnel must order the individual wires in accordance with a desired sequence before placement in a connector to effect termination. It will be further appreciated that by removing a substantial portion of the outer covering 146 from the distal end of the twisted-pair cable 13, the wire conductors 144a through 144n are easily manipulated and ordered. Although the individual wires 144a through 144n no longer are enclosed in the outer layer 146, adequate durability of the wires and integrity of the system is maintained, particularly since the wiring is rarely handled.

The crimp modular jack 12 comprises a housing 148 having a front wall or face portion 42, and a plurality of sidewalls, illustratively shown as sidewalls 152 and 154. The sidewalls form a box-like head section 156 that is sized to fit within a wall panel aperture 22 (shown in FIG. 1) to provide an efficient termination. The wall 154 is a top wall and includes a snap-fit interlocking tab 32 including a flexible blade 36 to provide mating engagement with a wallplate aperture as described herein. The housing 148 further provides a seating tab 30 which coacts with the interlocking tab 32 to mate with the receiving wallplate aperture. The modular jack 12 is preferably a molded plastic structure which is configured in such a manner to be fabricated in a unitary, one-piece mold.

The modular jack 12 includes a plurality of contact elements 158a through 158n disposed within respective longitudinal slots 160a through 160n formed in the head section 156. Each contact element includes a terminal knife portion 162 and an active contact portion 164 (shown in FIG. 6) with a distal end 166 (shown in FIG. 6). Each terminal knife portion 162 is also supported within respective longitudinal sockets 168, which are in communication with the longitudinal slots 160 and disposed in the top wall 154.

FIGS. 5 and 6 also show a tail section 170 of the crimp modular jack 12. The tail section 170 includes a longitudinal passageway 172 for receiving the plurality of conducting wire elements 144a through 144n. The passageway 172 provides lateral and transverse alignment for the wire elements threaded within the crimp modular jack 12. The tail section 170 also provides an inelastic plastic deformable tab or knuckle 174. The knuckle 174 is compressed and firmly engages the wire elements 144a through 144n between the knuckle portion 174 and a housing stop surface 176 (FIG. 6) formed in the tail section 170. The knuckle 174 engages the wire elements, rather than the covering layer 146, to provide a mechanical connection with adequate strain relief for the termination. The strain relief provided by engaging the wire elements is actually greater than providing a mechanical connection by crimping the covering layer 146.

AS best shown in FIG. 5, the tail section 170 includes outwardly protruding side walls 174 and 175. Accordingly, when the crimp modular jack is inserted in a receiving aperture 22F of a wall panel 10, the protruding sidewalls 174 and 175 provide stop surfaces 44 and 46 for abutting the crimp modular jack 12 within the receiving aperture 22F (FIG. 1).

FIG. 7 shows in greater detail the crimp modular plug 14 of FIG. 1 for terminating twisted-pair cable 15 using the teachings of the present invention. The crimp modular plug 14 comprises a plastic unitary housing 176 of the same size and shape as known modular plugs. A longitudinal passageway 178 receives the individual wire conductors 180a through 180n, ordered for placement into desired longitudinal receiving slots (not shown). The individual wires are exposed from the cable covering layer 182.

A plurality of contact elements (not shown) are disposed within longitudinal sockets 184a through 184n formed in the top wall and extending to the face of the plug housing 176. As with the crimp modular jack 12 shown in FIGS. 5–6, each of the contact elements comprises a knife portion supported within the respective sockets 184a through 184n. The contact elements are compressed against the conducting portions of the individual wire conductors 180a through 180n to form an electrical interconnection as is well known to those skilled in the art.

As described hereinbefore in connection with the crimp modular jack 12, the modular plug plastic housing 176 includes a deformable knuckle portion 186 that is compressed against the individual wire portions 180a through 180n to securely grasp and control the wire portions between the knuckle portion 186 and a housing stop surface (not shown). In this way, a mechanical interconnection is effected which provides superior strain relief to known methods of securing the covering layer 182 within the housing 176.

Figure 10:
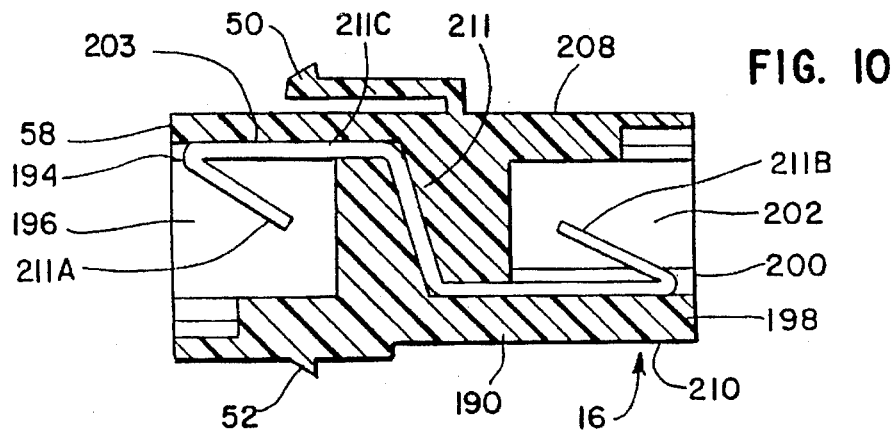
FIG. 10 is a section of the coupler assembly shown in FIG. 8 taken along the lines 10—10.

FIGS. 8–10 illustrate the coupler element 16 in accordance with the present invention. The coupler 16 comprises a substantially box-like housing 190 including a first end wall 58 with an aperture 194 for defining a cavity 196 of a size and dimension for receiving an MMP such as the modular plug 14 (FIG. 7). A second end wall 198 has an aperture 200 for defining a second cavity 202 for receiving a complementary MMP. A plurality of sidewalls 204, 206, 208, and 210 also define the housing 190.

A plurality of terminal assemblies 211 disposed within the coupler housing 190 provide the electrical interconnection for modular plugs received within cavities 196 and 202. Each of the terminal assemblies 211 comprises a pair of contacting leg portions 211A and 211B disposed with the receiving cavities 196 and 202, respectively, for engaging the contact elements of a modular plug inserted within the receiving cavities. The contacting leg portions 211A and 211B are electrically connected by a conducting member 211C. It will be appreciated, however, that in another embodiment, the coupler element 16 may be configured to form an MP—MP termination or even an MP-MMP termination.

The coupler element 16 further includes a snap-fit interlocking tab 50 and a seating tab 52. The interlocking tab 50 and the seating tab 52 coact to mate with the receiving wall panel aperture 22 (FIG. 1). In addition, the coupler element includes a plurality of tabs 212, 214, 216, and 218 extending outwardly of the sidewalls of the housing 190 to provide stop surfaces 54 and 56 for seating the coupler 16 within the wallplate aperture 22A (shown in FIG. 1) upon insertion therein.

Figure 11:
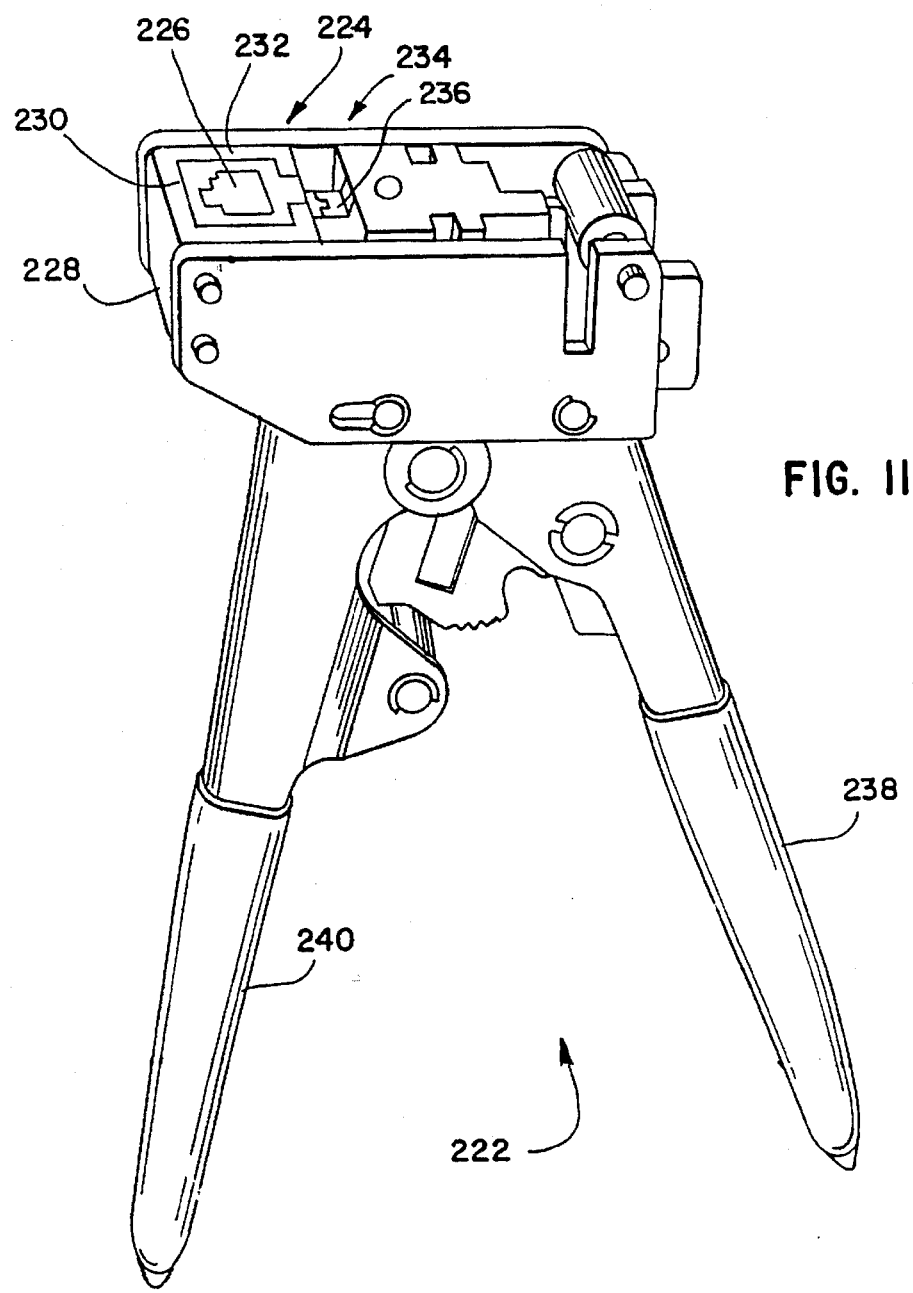
FIG. 11 is a perspective view of a crimping tool showing crimping die therein for crimping the modular jack of FIG. 5.

FIG. 11 shows a crimping tool 222 of the type well known to those skilled in the art. However, it provides a very important feature that distinguishes it from known devices. A die 224 is provided with a receiving cavity 226 defined by sidewalls 228, 230 and 232. The size and dimension of the receiving cavity 226 is selected to receive the head section 148 as well as at least a portion of the tail section 170 of the crimp modular jack 12 shown in FIG. 5. The sidewalls of the die 224 are preferably fabricated of steel. An anvil section 234 is positioned relative to the receiving cavity 226 and includes a knuckle-driving portion 236 and spaced contact element driving portions (not shown).

To effect termination of a twisted-pair cable in the modular jack 12, the outer covering layer 146 is removed from the distal end portion of the cable 13. The plurality of conducting wire elements 144a through 144n is thereby removed. Preferably, approximately one or two inches of the covering layer 146 are removed. Accordingly, the conducting wire elements are freely manipulated by the installer.

The exposed conducting wire elements 144a through 144n are arranged in accordance with a preselected sequence corresponding to the longitudinal insertion slots 160a through 160n in the modular jack 12. As will be appreciated by those skilled in the art, such a sequence may, for example be color coded within the longitudinal sockets 168 of the modular jack 12.

The ordered conducting elements 144 are thereafter threaded within respective insertion slots 160a through 160n. In this operation, the conducting elements are simultaneously placed within the insertion slots 160. The invention thereby eliminates the sequential placement of individual conducting wires into respective receiving slots or punching slots, one at a time, which is quite time consuming in operations where hundreds of terminations are typically made. In addition, actual crimping takes place independent of the outer covering. Crimping the wire elements in this manner provides a strong engaging force acting on the wires and cable.

In order to perform a crimping operation to a modular jack connector, the crimp modular jack 12 with inserted wires (shown in FIG. 5) is inserted within the receiving cavity 226 of the die 224 (See FIG. 11) with the knuckle portion 174 and longitudinal sockets 168 facing the anvil section 234. The dimensions of the receiving cavity 226 are chosen to securely grasp and control the head section 148 and at least a portion of the tail section 170 so that a desired crimp is achieved. Thereafter, the handles 238 and 240 of the crimp tool 222 are compressed inwardly to drive the anvil section toward the receiving cavity 226 and modular jack 12. In this way, the knuckle portion 174 of the crimp modular jack 12 is crimped or otherwise compressed radially transversely inward against the conducting wire elements. The dimensions and conditions of the knuckle portion 174 are controlled such that the knuckle portion 174 does not undergo undesired elongation. Some elongation of the knuckle portion 174, particularly along the wire surfaces, typically occurs, however. In addition, the contact elements 158 are compressed transversely inwardly to engage the conducting portions of the individual wires 144a through 144n. As with the insertion of the wire elements within the jack 12, all the conducting wires are mechanically and electrically terminated simultaneously.

Once the jack 12 has been crimped onto the wire elements, the connector assembly is ready for subsequent operations. These include placement of the modular jack assembly 12 within a wall panel 10 (FIG. 1) and/or mating with a modular plug to form an electrical connection.

The method of termination of twisted-pair cable with a modular plug 14 operates in a similar manner. As with the modular jack 12, a portion of the outer covering layer 182 is removed from the distal end portion of the cable 15, thereby exposing the conductive wire elements. The wire elements are simultaneously arranged for reception with desired longitudinal sockets within the modular plug 14. The contact elements in the plug 14 are thereafter compressed transversely inwardly onto the wire elements. Simultaneously, the knuckle portion 186 is compressed onto the wire elements to form a mechanical connection without engaging the outer covering layer. In this way, a stronger crimp is formed than in methods which engage the covering layer in a significantly decreased amount of time necessary to perform termination. The modular plug 14 is thereafter mated within a crimp MMJ, or an MMJ in an existing system. The modular plug 14 may also be inserted within a coupler 16 and thereafter interconnected with another modular plug.

From the description thus far provided, a wiring distribution system using twisted-pair connector devices that overcome the aforestated deficiencies in the prior art by providing simple crimp assemblies and couplers without the use of precise manipulation of the individual conducting wires or punching techniques has been described. It will be apparent that the proposed system may be used in a number of applications and that a number of modifications can be made in the invention disclosed, particularly by those having the benefit of the foregoing teachings, without departing from the spirit of these principles. However, these features preferably are utilized together in the systems and assemblies described herein. Accordingly, while the invention disclosed herein has been described with reference to the presently contemplated best mode for practicing the invention, it is intended that this invention be limited only by the scope of the appended claims.

What is claimed is:

1. An arrangement of modular couplers for use in a modular building wiring distribution system to establish a plurality of building wiring connections between any of a plurality of points of origin through any of a plurality of points of connection to any of a plurality of points of termination, said modular building wiring distribution system comprising a panel having a plurality of aligned receiving apertures, each of said receiving apertures corresponding to one of said plurality of points of connection, each of said modular couplers being interchangeable with a modular jack in any one of said receiving apertures to establish a wiring connection between one of said plurality of points of connection and one of said plurality of points of origin without the use of a hardwire connection, said arrangement comprising:

a first one of said modular couplers being positioned in a first one of said receiving apertures corresponding to a first selected point of connection, said first one of said modular couplers being adapted for connection to a point-of-origin cable at a first end of said point-of-origin cable, said point-of-origin cable having a second end adapted for connection to a first selected point of origin so that said first one of said modular couplers provides a connection between said first selected point of origin and said first selected point of connection;

a second one of said modular couplers being positioned in a second one of said receiving apertures corresponding to a second selected point of connection, said second one of said modular couplers being adapted for connection to a connecting cable at a first end of said connecting cable, said connecting cable having a second end adapted for connection to a second selected point of origin so that said second one of said modular couplers provides a connection between said second selected point of origin and said second selected point of connection;

said first modular coupler being adapted to receive a first modular plug that is connected to a twisted-pair cable at a first end of said twisted-pair cable, said twisted-pair cable having a second end that provides an electrical connection to a first point of termination so that an electrical connection is made from said first point of origin through said first point of connection to said first point of termination;

said second modular coupler being adapted to receive a second modular plug that is connected to a point-of-termination cable at a first end of said point-of-termination cable, said point-of-termination cable having a second end that provides an electrical connection to a second point of termination so that an electrical connection is made from said second point of origin through said second point of connection to said second point of termination;

said first modular coupler being alternatively releasably positionable within said second one of said receiving apertures for establishing a wiring connection between said first point of origin and said second point of connection;

said second modular coupler being alternatively releasably positionable within said first one of said receiving apertures for establishing a wiring connection between said second point of origin and said second point of connection; and said first modular coupler being adapted to alternatively receive said second modular plug instead of said first modular plug to provide an electrical connection from said first point of connection to said second point of termination regardless of the type of connector associated with said first or second point of termination or said first or second point of origin; and said second modular coupler being adapted to alternatively receive said first modular plug instead of said second modular plug to provide an electrical connection from said second point of connection to said first point of termination regardless of the type of connector associated with said first or second of point of termination or said first or second point of origin.

2. The arrangement of modular couplers of claim 1, each of said modular couplers further comprising:

an insulative modular housing having a box-like head section and a tail section integrally associated therewith, said head section defined by four sidewalls and a face wall, said face wall having an aperture defining a receiving cavity for receiving a complementary modular plug, said tail section including a passageway for receiving a plurality of twisted-pair wires, a stop surface, and an inelastically deformable knuckle portion transversely inwardly compressed for retaining said individual ones of said twisted-pair wires between said knuckle portion and said stop surface;

a plurality of longitudinal slots formed in said head section for receiving said individual ones of said twisted-pair wires; and a plurality of electrical contacting elements, each of said contacting elements having at least a portion disposed in respective ones of said longitudinal slots and having a crimped knife portion compressed into electrical engagement with one of said twisted-pair wires, and a cantilevered leg portion extending from said knife portion into said receiving cavity for forming an electrical interconnection with said complementary modular plug.

3. An arrangement of modular couplers for use in a modular building wiring distribution system to establish a plurality of building wiring connections between any of a plurality of points of origin through any of a plurality of points of connection to any of a plurality of points of termination, said modular building wiring distribution system comprising a panel having a plurality of aligned receiving apertures, each of said receiving apertures corresponding to one of said plurality of points of connection and having mounting means associated therewith, each of said modular couplers being interchangeable with a modular jack in any one of said receiving apertures to establish a wiring connection between one of said plurality of points of connection and one of said plurality of points of origin without the use of a hardwire connection, said arrangement comprising:

a first modular coupler having a first recessed end, a second recessed end and electrical contact means extending therebetween, each of said first and second recessed ends being adapted to receive a modular plug, said first modular coupler having detail means for releasably engaging said mounting means associated with a first selected one of said receiving apertures corresponding to a first point of connection;

a second modular coupler having detail means for releasably engaging said mounting means of a selected one of said receiving apertures corresponding to a second point of connection;

said first modular coupler being adapted for connection at one of said recessed ends thereof to a first modular plug that is connected to a point-of-origin cable at a first end of said point-of-origin cable, said point-of-origin cable having a second end that is connected to a first point of origin to provide an electrical connection between said first point of connection and said first point of origin;

said second modular coupler being adapted to receive a second modular plug that is connected to a connecting cable at a first end of said connecting cable, said connecting cable having a second end that is connected to a second point of origin to provide an electrical connection between a second point of connection and a second point of origin; and said first modular coupler and said second modular coupler being adapted to alternatively releasably receive a third modular plug that is connected to a point-of-termination cable at a first end of said point-of-termination cable, said point-of-termination cable having a second end that is connected to a first point of termination, said third modular plug being alternatively releasably positionable in either said first modular coupler or said second modular coupler to connect said first point of termination to either said first point of origin or said second point of origin.

4. The arrangement of claim 3, wherein each modular coupler further comprises:

an insulative modular housing having a box-like head section and a tail section integrally associated therewith, said head section defined by four sidewalls and a face wall, said face wall having an aperture defining a receiving cavity for receiving a complementary modular plug, said tail section including a passageway for receiving a plurality of twisted-pair wires, a stop surface, and an inelastically deformable knuckle portion transversely inwardly compressed for retaining said individual ones of said twisted-pair wires between said knuckle portion and said stop surface;

a plurality of longitudinal slots formed in said head section for receiving said individual ones of said twisted-pair wires; and a plurality of electrical contacting elements, each of said contacting elements having at least a portion disposed in respective ones of said longitudinal slots and having a crimped knife portion compressed into electrical engagement with one of said twisted-pair wires, and a cantilevered leg portion extending from said knife portion into said receiving cavity for forming an electrical interconnection with said complementary modular plug.

* * * * *